US009893914B2

(12) United States Patent
Deniau et al.

(10) Patent No.: US 9,893,914 B2
(45) Date of Patent: Feb. 13, 2018

(54) APPARATUS AND METHOD FOR CHANGING FREQUENCY DEVIATION

(71) Applicant: Continental Automotive Systems, Inc., Auburn Hills, MI (US)

(72) Inventors: Jean-Christophe Deniau, Fenton, MI (US); Brian J Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/116,638

(22) PCT Filed: Feb. 17, 2015

(86) PCT No.: PCT/US2015/016176
§ 371 (c)(1),
(2) Date: Aug. 4, 2016

(87) PCT Pub. No.: WO2015/126833
PCT Pub. Date: Aug. 27, 2015

(65) Prior Publication Data
US 2016/0352550 A1  Dec. 1, 2016

Related U.S. Application Data

(63) Continuation of application No. 14/185,511, filed on Feb. 20, 2014, now Pat. No. 9,357,548.

(51) Int. Cl.
H03C 3/00 (2006.01)
H03K 7/06 (2006.01)
H04L 27/12 (2006.01)
H04W 72/04 (2009.01)
H04L 27/10 (2006.01)
B60C 23/04 (2006.01)
(Continued)

(52) U.S. Cl.
CPC ........ *H04L 27/127* (2013.01); *B60C 23/0462* (2013.01); *H04B 1/082* (2013.01); *H04L 27/10* (2013.01); *H04L 27/152* (2013.01); *H04L 67/12* (2013.01); *H04W 72/0453* (2013.01)

(58) Field of Classification Search
CPC .................................................. B60C 23/0408
USPC .......................................................... 375/303
See application file for complete search history.

(56) References Cited

U.S. PATENT DOCUMENTS 4,450,431 A   5/1984 Hochstein
6,469,621 B1  10/2002 Vredevoogd et al.
(Continued)

FOREIGN PATENT DOCUMENTS

CN   101527581        9/2009
EP   2272688 A2       1/2011
(Continued)

OTHER PUBLICATIONS

PCT/US2015/016176 The International Search Report and the Written Opinion of the International Searching Authority dated May 12, 2015.
(Continued)

*Primary Examiner* — Fabricio R Murillo Garcia

(57) ABSTRACT

A protocol to be used in the transmission is determined. Based upon the protocol, the transmission frequency range of a clock is selectively altered. TPMS data is transmitted according to the altered transmission frequency range of the clock.

12 Claims, 4 Drawing Sheets

(51) Int. Cl.
    *H04B 1/08*       (2006.01)
    *H04L 27/152*    (2006.01)
    *H04L 29/08*     (2006.01)

(56) References Cited

U.S. PATENT DOCUMENTS

| | | |
|---|---|---|
| 2004/0155762 A1 | 8/2004 | Lefaure |
| 2008/0024287 A1* | 1/2008 | Boyle ................ B60C 23/0408 |
| | | 340/442 |
| 2009/0072959 A1* | 3/2009 | Matsumura ......... B60C 23/0408 |
| | | 340/447 |
| 2009/0225905 A1 | 9/2009 | Suzuki |
| 2011/0150141 A1* | 6/2011 | Gauthier ............... H03L 7/1976 |
| | | 375/316 |
| 2011/0241482 A1 | 10/2011 | Droit et al. |
| 2014/0022069 A1 | 1/2014 | Lichtenegger |
| 2014/0306815 A1 | 10/2014 | Henriet et al. |

FOREIGN PATENT DOCUMENTS

| | | |
|---|---|---|
| EP | 2378286 A1 | 10/2011 |
| EP | 2451659 A1 | 5/2012 |
| JP | 2004-242323 | 8/2004 |

OTHER PUBLICATIONS

Amtel "Fractional-N PLL Transmitter IC", Datasheet, Aug. 1, 2011, pp. 1-26, XP055154625, San Jose, CA, retrieved from the internet: URL: www.amtel.com on Nov. 24, 2014.

\* cited by examiner

APPARATUS AND METHOD FOR CHANGING FREQUENCY DEVIATION

CROSS-REFERENCE TO RELATED APPLICATIONS

This application claims the benefit of U.S. application Ser. No. 14/185,511 filed Feb. 20, 2014, and PCT Application No, PCT/US2015/016176, filed Feb. 17, 2015. The disclosure of the above applications are incorporated herein by reference.

TECHNICAL FIELD

This application relates to tire pressure sensors and, more specifically transmissions made to and from these devices.

BACKGROUND OF THE INVENTION

Tire pressuring monitoring (TPM) devices are used in today's vehicles. A tire pressure sensor senses the tire pressure reading (or other conditions, such as the temperature of the tire). These sensed readings may be communicated to a TPM receiver that is disposed in the vehicle. A display screen may also be coupled to the receiver. When the tire pressure reading falls below a particular threshold, the driver of the vehicle may be alerted, for example, by an alert message being displayed to the driver on the screen. The driver can then take any required action.

Most TPM sensors have a specific frequency deviation when they transmit frequency-shift keying (FSK) data. For example, the frequency deviation may be 315 Mhz +/−20 hz or 40 khz of deviation (or range). Thus, 314.98 Mhz may be used for transmission of a logic "0" (in the FSK scheme) while 315.02 Mhz may represent a logic 1. The exact frequency deviation is chosen when the TPM sensor is engineered and must be in accordance with the bandwidth and frequency discrimination of the receiver used to receive the FSK data.

Many TPM sensors have a FSK frequency deviation of between +/−30 Khz to +/−50 Khz. This means that the bandwidth of the receiver must be around 200 kHz. A wide receiver bandwidth is cost effective, but is linked to more in-band noise coming from different sources. This in-band noise decreases the sensitivity of the sensor in some cases.

Some original equipment manufacturers (OEMs) require a smaller bandwidth receiver. Thus, the TPM sensor working with such a receiver must also limit its frequency deviation. In some cases, a TPM sensor with a wide frequency deviation may not be received at all by a narrow band receiver or can be attenuated.

BRIEF DESCRIPTION OF THE DRAWINGS

For a more complete understanding of the disclosure, reference should be made to the following detailed description and accompanying drawings wherein.

Figure 1:
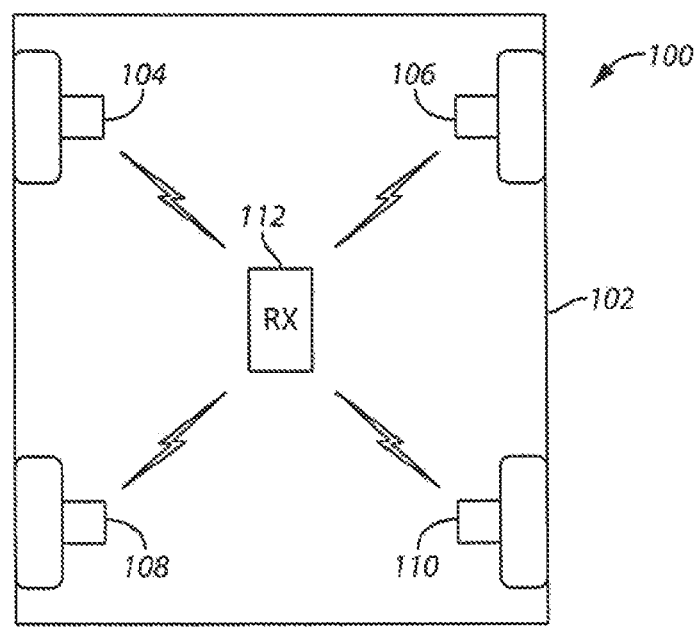
FIG. 1 comprises a block diagram of a system that changes FSK frequency deviation on the fly according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided that implement a frequency-shift keying (FSK) frequency deviation switch for multi-application tire pressure monitoring (TPM) sensors or for any different radio frequency (RF) transmitters requiring different frequency deviations. The frequency deviation of the transmitted FSK signal is adjusted based upon the protocol to be transmitted. The TPMS sensors (or monitors or wheel units) may include processing devices and memories and execute computer instructions to sense and transmit tire pressure (or other) data. In these regards, the TPMS sensors may themselves include structures, devices, or apparatus that actually sense the pressure (or other types of data) in the tire, and make transmissions of the sensed information.

In one aspect, the TPM sensor uses a phase locked loop (PLL) to modulate and transmit the FSK data to the receiver. In some cases, the PLL offers the ability to use internal capacitors instead of external capacitors to create the desired frequency deviation. Typically. TPM sensor manufacturers prefer to use external load capacitors to the crystal oscillator as these represent fixed values.

In the present approaches, a bank of capacitors is offered by a PLL of the TPM sensor and this bank of capacitors can be either switched on or off depending upon the frequency deviation that is required. The bank of capacitors can be implemented with discrete components.

In many of these embodiments, a protocol that is to be used in the transmission is determined. Based upon the protocol, the transmission frequency range (or deviation) of a clock is selectively altered. TPMS data is transmitted according to the altered transmission frequency range (or deviation) of the clock.

In some aspects, selected ones of a plurality of capacitors that are coupled to the clock are selectively switched in and out of the transmission circuit. In other aspects, the transmissions are performed according to a frequency-shift keying (FSK) approach. In still other examples, the protocol is a selected protocol from a plurality of protocol and each of the plurality of protocols is associated with a different automobile manufacturer.

In other aspects, the clock is a crystal oscillator. In yet other aspects, the approaches are performed by a phase-locked loop (PLL).

In others of these embodiments, an apparatus for transmitting tire pressuring monitoring system (TPMS) data includes an interface and a controller. The interface has an input and an output. The controller is coupled to the interface. The controller is configured to determine a protocol to be used in the transmission and, based upon the protocol, selectively produce control signals that alter the transmission frequency range (or deviation) of a clock. The controller is further configured to transmit TPMS data according to the altered transmission frequency range (or deviation) of the clock at the output.

Referring now to FIG. 1, a system 100 that changes FSK frequency deviation on the fly for a multi-application TPMS sensor is described. The system 100 includes a first TPMS monitor (or sensor or unit or wheel unit) 104, a second TPMS monitor 106, a third TPMS monitor 108, and a fourth TPMS monitor 110. The monitors 104, 106, 108, and 110 communicate with a receiver 112. The communication between the TPMS monitors 104, 106, 108, and 110 and the receiver 112 is accomplished in one aspect via wireless, radio frequency (RF) links.

The TPMS monitors 104, 106, 108, and 110 may include processing devices and memories and execute computer instructions to sense and transmit tire pressure (or other) data. In these regards, the TPMS monitors 104, 106, 108, and 110 may themselves include structures, devices, or apparatus that actually sense the pressure (or other types of data) in the tire.

The receiver 112 includes hardware and/or software to receive (and in some examples transmit) information from the TPMS monitors 104, 106, 108, and 110. The receiver 112 is disposed at an appropriate location within the vehicle 102.

The TPMS monitors 104, 106, 108, and 110 each implement at a minimum a FSK frequency deviation switch and are multi-application sensors. The sensors may also attenuate using amplitude-shift keying (ASK). That is, the monitors can change frequency deviation on the fly. In other words, the frequency deviation or range of the transmitted FSK signals from the TPMS monitors 104, 106, 108, and 110 are adjusted based upon the protocol to be transmitted.

In one aspect, the TPMS monitors 104, 106, 108, and 110 utilize a phase locked loop to modulate and transmit the FSK data to the receiver 112. In some cases, the PLL offers the ability to use internal capacitors instead of external capacitors to create the desired frequency deviation. More specifically, a bank of capacitors is offered by a PLL and this bank of capacitors can be either switched on or off depending upon the frequency deviation that is required. The bank of capacitors can be implemented using discrete components.

Figure 2A:
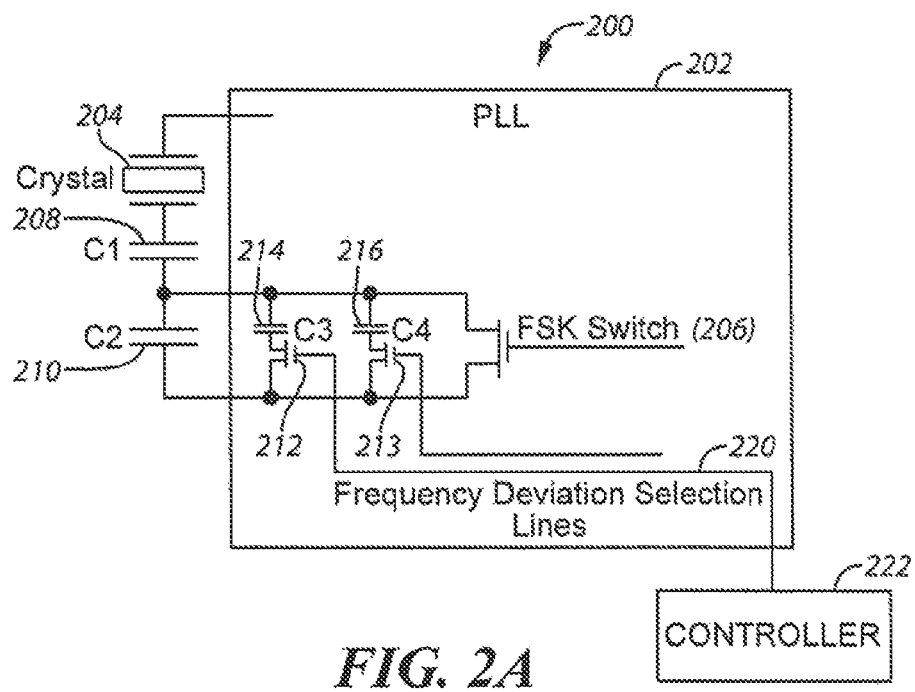
FIG. 2A comprises a block diagram of a FSK switching arrangement for a TPMS monitor with capacitors inside the PLL according to various embodiments of the present invention.
Figure 2B:
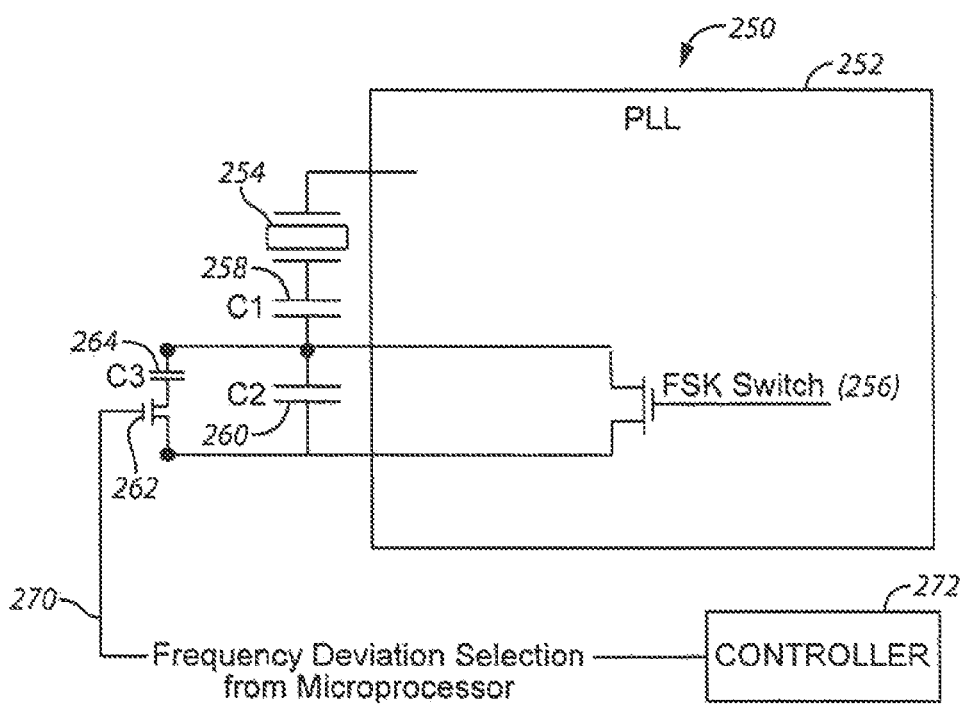
FIG. 2B comprises a block diagram of a FSK switching arrangement for a TPMS monitor with capacitors outside the PLL according to various embodiments of the present invention.
Figure 2C:
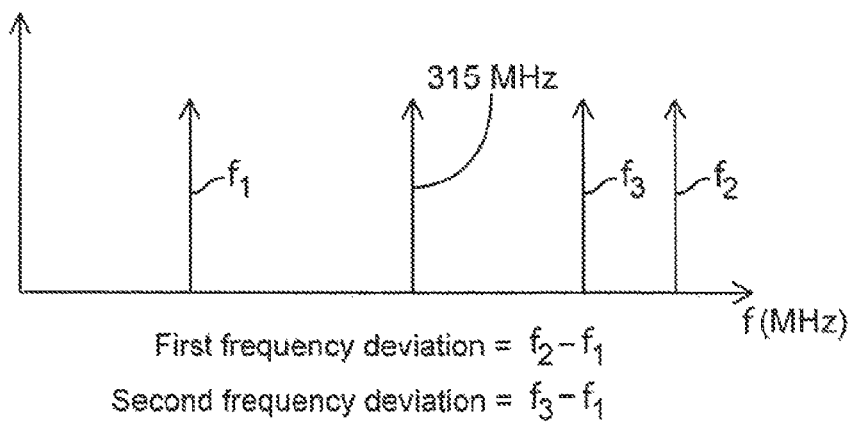
FIG. 2C comprises a frequency response graph showing frequency deviations according to various embodiments of the present invention.

Referring now to FIGS. 2A and 2C, one example of a circuit 200 for changing FSK frequency deviation on the fly is described. The circuit 200 includes a phase locked loop (PLL) 202, a clock (e.g., crystal oscillator) 204, a FSK switch 206, a first capacitor (C1) 208, a second capacitor (C2) 210, a first frequency deviation selection switch 212, a second frequency deviation selection switch 213, a third capacitor (C3) 214, and a fourth capacitor (C4) 216 where C1, C2, C3 and C4 are the values of the capacitors.

The oscillator 202 oscillates at a certain frequency. If a high signal (a "1") is applied to the FSK switch 206, the switch 206 closes and the second capacitor (C2) 210 is shorted. A low "tone" with frequency equal to f1 is transmitted. If a low signal (a logic "0") is applied to the FSK switch 206, the switch 206 is open and the second capacitor (C2) 210 is not shorted. A high "tone" with frequency equal to f2 can also be transmitted. F2 is higher than f1 because the equivalent capacitance (CA) is (C1)(C2)/(C1+C2) and this is less than C1. Consequently, f2 is greater than f1. The frequency deviation is f2−f1. These examples assume low signals are applied to the first frequency deviation selection switch 212 and the second frequency deviation selection switch 213.

If a smaller frequency deviation is desired, f1 remains the same since it is driven by C1. F2 is changed to a smaller value (f3) so the frequency deviation (f3−f1) is smaller than f2−f1. In particular, a high signal is applied to first frequency deviation selection switch 212, a low signal is applied to the second frequency deviation selection switch 213, and a low signal is applied to FSK switch 206. Then, the equivalent capacitance (CB) becomes C1/(C2+C3). 1/CB=1/C1+1/(C2+C3)=(C2+C3)/C1(C2+C3)+C1/C1(C1(C2+C3)=(C1+C2+C3)/C1C2+C1C3. Thus, CB=(C1C2+C1C3)/(C1+C2+C3). CB is greater than CA. Thus f3 (the new "High tone" frequency is less than f2. With the first frequency deviation being f2−f1, and the second deviation (with the addition of the capacitor bank being f3−f1, it can be appreciated that the second frequency deviation is less than the first frequency deviation. The fourth capacitor 216 may also be added to decrease the deviation further. Alternatively, the third capacitor 214 may be switched out and the fourth capacitor 216 switched in to give another frequency deviation.

The controller 222 determines when to switch in or out third capacitor 214 (via line 220) and the fourth capacitor 216. In this example, the third capacitor 214 and the fourth capacitor 216 are located in the PLL 202. Similarly, controller 272 and line 270 in FIG. 2B provide frequency deviation selection.

Referring now to FIGS. 2B and 2C, another example of a circuit 250 for changing FSK frequency deviation on the fly is described. The circuit 250 includes a phase locked loop (PLL) 252, a clock (e.g., crystal oscillator) 254, a FSK switch 256, a first capacitor (C1) 258, a second capacitor (C2) 260, a frequency deviation selection switch 262, and a third capacitor (C3) 264, C1, C2, C3 and C4 are the values of the capacitors.

The oscillator 252 oscillates at a certain frequency. If a high signal (a "1") is applied to the FSK switch 256, the switch 256 closes and the second capacitor (C2) 260 is shorted. A low "tone" with frequency equal to f1 is transmitted. If a low signal (a logic "0") is applied to the FSK switch 256, the switch 256 is open and the second capacitor (C2) 260 is not shorted. A high "tone" with frequency equal to f2 can also be transmitted. F2 is higher than f1 because the equivalent capacitance (CA) is (C1)(C2)/(C1+C2) and this is less than C1. Consequently, f2 is greater than f1. The frequency deviation is f2−f1. These examples assume low signals are applied to the frequency deviation selection switch 262.

If a smaller frequency deviation is desired, f1 remains the same since it is driven by C1. F2 is changed to a smaller value (f3) so the frequency deviation (f3−f1) is smaller than f2−f1. In particular, a high signal is applied to frequency deviation selection switch 262, and a low signal is applied to FSK switch 256. Then, the equivalent capacitance (CB) becomes C1/(C2+C3). 1/CB=1/C1+1/(C2+C3)=(C2+C3)/C1(C2+C3)+C1/C1(C1(C2+C3)=(C1+C2+C3)/C1C2+C1C3. Thus, CB=(C1C2+C1C3)/(C1+C2+C3). CB is greater than CA. Thus f3 (the new "High tone" frequency is less than f2. With the first frequency deviation being f2−f1, and the second deviation (with the addition of the capacitor bank being f3−f1, it can be appreciated that the second frequency deviation is less than the first frequency deviation.

Other capacitors may be added in parallel to the third capacitor (C3) 256 and as showed in the example of FIG. 2A.

As shown in both FIG. 2A and FIG. 2B, the PLL 202 and 252 provides a fixed frequency deviation. The first capacitor 208 or 258 (C1) is the load capacitor for the crystal oscillator 204 or 254 resulting in the lower carrier of the FSK signal. During, the low carrier transmission, the FET (FSK switch) 206 or 256 shorts the second capacitor 210 or 260 (C2) to ground. For the high frequency carrier, the FET switch 206 or 256 is opened and the second capacitor 210 or 260 (C2) is in series with the first capacitor 208 or 258 (C1) creating a different load on the crystal and a different carrier transmission frequency.

Figure 3:
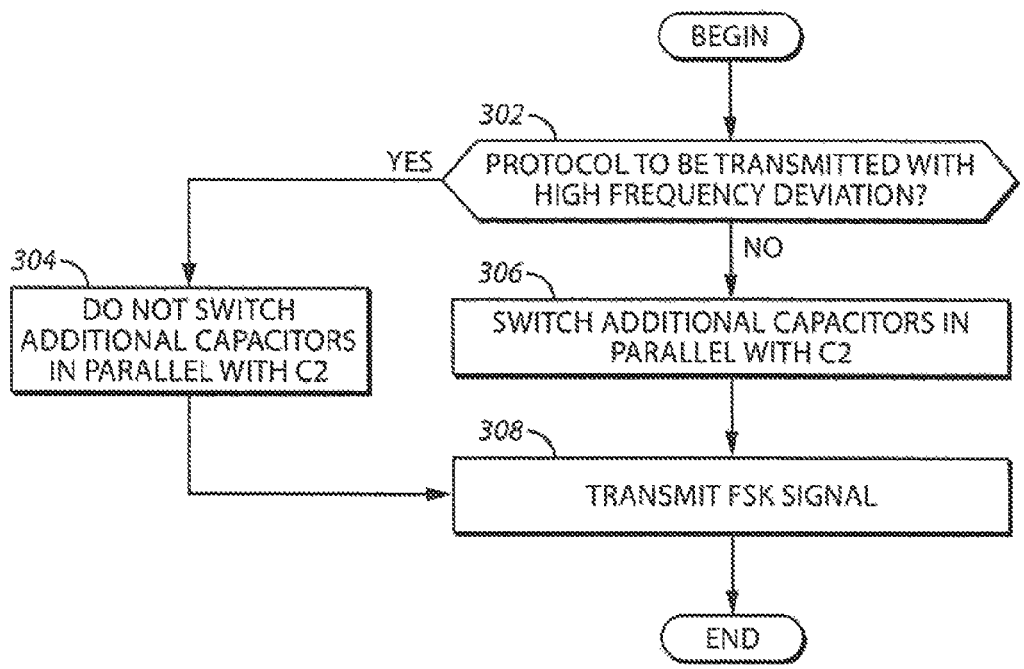
FIG. 3 comprises a flowchart of an approach for FSK switching according to various embodiments of the present invention.

Referring now to FIG. 3, one example of an approach for FSK switching is described. At step 302, it is determined if the protocol to transmit includes a high frequency deviation. For example, a threshold may be used and if the transmission protocol has a frequency deviation that exceeds this threshold then the step is answered in the affirmative. On the other hand, if the desired protocol falls below the threshold then the answer is negative.

If the answer at step 302 is affirmative, then at step 304 additional capacitors in parallel with a loading capacitor (e.g., the second capacitor 208 or 258 in FIG. 2A and FIG. 2B) are not switched in parallel with the loading capacitor. This action maintains a relatively high frequency deviation.

If the answer at step 302 is affirmative, then at step 306 additional capacitors in parallel with a loading capacitor (e.g., the second capacitor 208 or 258 in FIG. 2A and FIG. 2B) are switched in parallel with the loading capacitor. This action decreases a high frequency deviation. For example, if the center frequency is 315 +/−20 khz, this action may decrease the deviation to +/−10 khz. In this way, the approaches accommodate a frequency range that the receiver in the vehicle is expecting.

Figure 4:
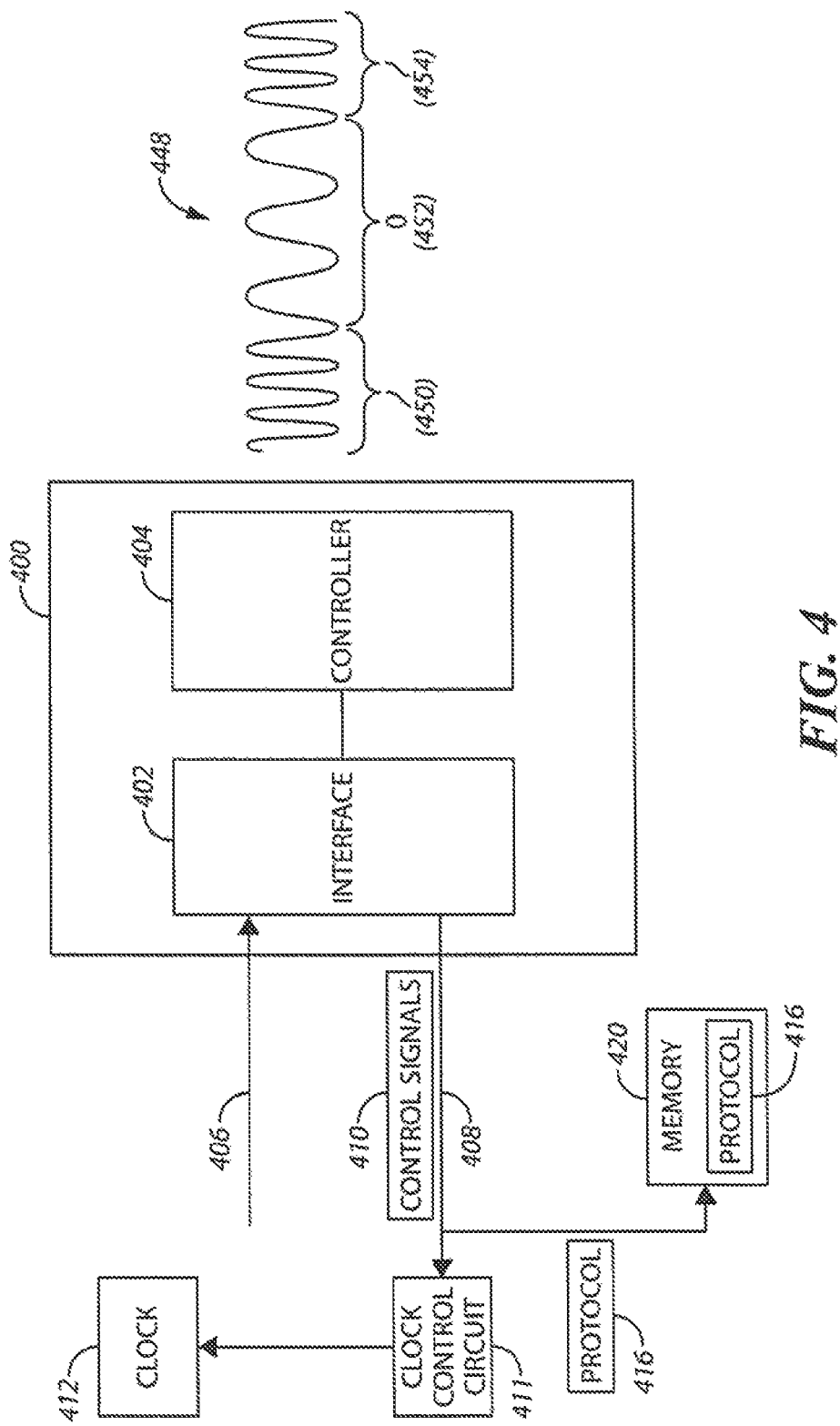
FIG. 4 comprises a block diagram of an apparatus that changes FSK frequency deviation on the fly according to various embodiments of the present invention.

Referring now to FIG. 4, an apparatus 400 for transmitting tire pressuring monitoring system (TPMS) data includes an interface 402 and a controller 404. The interface 402 has an input 406 and an output 408.

The controller 404 is coupled to the interface 402. The controller 404 is configured to determine a protocol 416 to be used in the transmission and, based upon the protocol 416, selectively produce control signals 410 that alter the transmission frequency of a clock 412. The protocol 416 may be received from a memory 420 at the input 406. The controller 404 is further configured to transmit TPMS data 414 according to the altered transmission frequency of the clock 412 at the output 408. The control signals 408 may control a control circuit 411 that actually changes the clock frequency.

Still referring to FIG. 4, a transmission 448 is shown and includes a first portion 450, a second portion 452, and a third portion 454. The first portion 450 is at a high frequency and represents a logic 1; the second portion 452 is at a lower frequency and represents a logic 0, and the third portion 454 is at the same high frequency as the first portion 450 and also represents a logic 1.

In the approaches described herein the range or deviation between high and low frequencies is altered on the fly based upon the protocol needed. For example, the difference between high frequency (of portions 450 and 454) and low frequency (portion 454) may need to be 20 khz for some transmission protocols and 30 khz for other protocols. As described herein, capacitors in a capacitor bank may be switched in or out of the transmission circuit. This switching of capacitors alters the "High tone" or high transmission frequency. Thus, if initially the low transmission frequency is f1, and the high transmission frequency is f2 (f2>f1), then the deviation is f2−f1. Inserting a capacitor into the transmission circuit changes f2 to f3 with f3<f2 and f1<f3. Thus, the second frequency deviation is f3−f1 and the second frequency deviation is less than the first frequency deviation.

As mentioned, the frequency deviation used can be selected according to the protocol used. By protocols, it is meant any parameter or group of parameters or characteristics that describes a transmission including, for example, data formats (e.g., positioning and meaning of bits), baud rates, to mention two examples. Other examples are possible.

It should be understood that any of the devices described herein (e.g., the programming or activation devices, PLLs, the wheel units, the controllers, the receivers, the transmitters, the sensors, any presentation devices, or the external devices) may use a computing device to implement various functionality and operation of these devices. In terms of hardware architecture, such a computing device can include but is not limited to a processor, a memory, and one or more input and/or output (I/O) device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth)) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method for transmitting tire pressure monitoring system (TPMS) data using frequency-shift keying (FSK) the method comprising:
   at a first time and at a first tire pressure monitoring system (TPMS) sensor, determining a first protocol to be used to transmit tire pressure monitoring data from a transmitter comprising the first TPMS sensor;
   selecting a first deviation between a first frequency used to transmit a logic one and a different second frequency used to transmit a logic zero, the first deviation being selected responsive to the first protocol determined;
   wherein the first deviation is selected at least in part by comparing a first deviation threshold with a first high frequency deviation associated with the first protocol;
   transmitting the TPMS data from the first TPMS sensor using the first frequency to represent a logic one and using the second frequency to transmit a logic zero;
   at a second time that occurs after the first time and at the first TPMS sensor, determining a second protocol to be used to transmit tire pressure monitoring data from the same transmitter of the first TPMS sensor;
   selecting a second deviation between a third frequency used to transmit a logic one and a fourth frequency used to transmit a logic zero;
   wherein the second deviation is selected at least in part by comparing a second deviation threshold with a second high frequency deviation associated with the second protocol;
   wherein the first deviation is different than the second deviation;
   transmitting the TPMS data from the first TPMS sensor using the third frequency to represent a logic one and using the fourth frequency to represent a logic zero;
   wherein the first protocol is changed to the second protocol during the operation of the first TPMS sensor;
   wherein the first protocol and the second protocol comprise one or more of a data format and baud rate;
   wherein the first protocol and the second protocol are determined at least in part by a controller.

2. The method of claim 1 wherein a change from the first frequency to the third frequency, and from the second frequency to the fourth frequency is realized by selectively connecting different capacitors.

3. The method of claim 1 wherein the first frequency and the third frequency are substantially the same.

4. The method of claim 1 wherein the first and second protocols are selected from a plurality of protocols, each protocol of the plurality of protocols being associated with a different automobile manufacturer.

5. The method of claim 1 wherein the second frequency and the fourth frequency are substantially the same.

6. The method of claim 1 wherein the method is performed by a phase-locked loop (PLL).

7. An apparatus for transmitting tire pressure monitoring system (TPMS) data using frequency-shift keying (FSK), the apparatus comprising,
   an interface having an input and an output;
   a controller coupled to the interface, the controller configured to:
   select, a first protocol to be used to transmit tire pressure monitoring data from a transmitter, which is located in a tire pressure monitor, the selected first protocol, having a first deviation, the first deviation being between a first frequency, which is used to transmit a logic one and a second and different frequency, which is used to transmit a logic zero, wherein the first deviation is selected at least in part by comparing a first deviation threshold with a first high frequency deviation associated with the first protocol;
   the controller being additionally configured to select a second protocol to be used to transmit tire pressure monitoring data from the same transmitter, and using the selected second protocol, select a second deviation between a third frequency that is used to transmit a logic one and a fourth frequency that is used to transmit a logic zero;
   wherein the second deviation is selected at least in part by comparing a second deviation threshold with a second high frequency deviation associated with the second protocol, wherein the first deviation is different than the second deviation;
   wherein the first protocol is switched to the second protocol during the operation of the tire pressure monitoring sensor;
   wherein the first protocol and the second protocol comprise one or more of a data format and baud rate.

8. The apparatus of claim 7 wherein control signals are effective to change the first frequency to the third frequency, and change the second frequency to the fourth frequency by selecting different capacitors.

9. The apparatus of claim 7 wherein the first and the third frequency are substantially the same.

10. The apparatus of claim 7 wherein the first and second protocols are selected from a plurality of protocols, each protocol of the plurality of protocols being associated with a different automobile manufacturer.

11. The apparatus of claim 7 wherein the second frequency and the fourth frequency are substantially the same.

12. The apparatus of claim 7 wherein the apparatus is disposed at a wheel unit.

* * * * *